(12) United States Patent
Suzuki et al.

(10) Patent No.: US 7,931,106 B1
(45) Date of Patent: Apr. 26, 2011

(54) ALL TERRAIN VEHICLE

(75) Inventors: Yasuhiro Suzuki, Shizuoka (JP); Kouji Yamamoto, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 7 days.

(21) Appl. No.: 12/604,418

(22) Filed: Oct. 23, 2009

(51) Int. Cl.
  B62D 21/00 (2006.01)
  B62D 31/00 (2006.01)
  B62D 33/00 (2006.01)
(52) U.S. Cl. ........ 180/89.1; 180/311; 180/908; 280/781
(58) Field of Classification Search .............. 180/89.1, 180/311, 908; 280/781; 296/187.01, 203.01
See application file for complete search history.

(56) References Cited

U.S. PATENT DOCUMENTS

| | | | | |
|---|---|---|---|---|
| 3,075,605 | A | * | 1/1963 | Nemeth .................. 180/89.1 |
| 3,419,098 | A | * | 12/1968 | Mayers et al. ............... 180/11 |
| 3,709,314 | A | * | 1/1973 | Hickey ..................... 180/249 |
| 4,131,170 | A | * | 12/1978 | van der Lely ................ 180/22 |
| 4,817,985 | A | * | 4/1989 | Enokimoto et al. .......... 280/788 |
| 4,881,610 | A | * | 11/1989 | Kosuge .................... 180/68.2 |
| 5,054,842 | A | * | 10/1991 | Ishiwatari et al. ........... 296/191 |
| 5,086,858 | A | * | 2/1992 | Mizuta et al. .............. 180/68.3 |
| 5,251,713 | A | * | 10/1993 | Enokimoto ............... 180/68.4 |
| 5,327,989 | A | * | 7/1994 | Furuhashi et al. ........... 180/248 |
| 6,099,039 | A | * | 8/2000 | Hine ........................ 280/781 |
| 6,889,782 | B2 | * | 5/2005 | Komatsu et al. ............. 180/6.2 |
| 6,990,757 | B2 | * | 1/2006 | Takemura et al. ............. 37/347 |
| 7,147,075 | B2 | * | 12/2006 | Tanaka et al. ............... 180/229 |
| 7,347,490 | B2 | * | 3/2008 | Kobayashi et al. .......... 296/204 |
| 7,438,147 | B2 | * | 10/2008 | Kato et al. ................ 180/68.1 |
| 7,650,959 | B2 | * | 1/2010 | Kato et al. .................. 180/312 |
| 2004/0206567 | A1 | | 10/2004 | Kato et al. |
| 2010/0194086 | A1 | * | 8/2010 | Yamamura et al. .......... 280/779 |
| 2010/0194087 | A1 | * | 8/2010 | Yamamura et al. .......... 280/781 |

* cited by examiner

*Primary Examiner* — Paul N Dickson
*Assistant Examiner* — Laura Freedman
(74) *Attorney, Agent, or Firm* — Keating & Bennett, LLP

(57) ABSTRACT

All terrain vehicle including front wheels, rear wheels, vehicle body frame, first roof supports, second roof supports, roof members, seat, front panel, front gear case, front suspensions, vehicle body cover, radiator, and head light units. The vehicle body frame includes upper frames, lower frames, and front frames. The first and second roof supports are each provided at lateral sides of the vehicle body frame. The right roof member connects upper portions of the right first and second roof supports. The left roof member connects upper portions of the left first and second roof supports. The radiator is positioned rearward of the front frames, forward of the front suspensions, and in a transverse center of the vehicle. The head light units are positioned above and longitudinally overlapping with the radiator.

7 Claims, 12 Drawing Sheets

ALL TERRAIN VEHICLE

BACKGROUND OF THE INVENTION

1. Field of the Invention

The present invention relates to an all terrain vehicle, especially to an all terrain vehicle including a radiator is disposed in a front section of a vehicle body.

2. Description of the Related Art

US Patent Publication No. 2004/0206567 A1 discloses an example of the conventional all terrain vehicles. The vehicle is provided with a cabin, functioning as a space for carrying a driver and a passenger. The cabin is disposed between front wheels and rear wheels in a longitudinal direction of the vehicle. Additionally, a front frame is disposed forward of the cabin. The front frame defines a portion of a vehicle body frame. A variety of components, including e.g., a front gear case, a pair of front suspensions and a radiator, are supported by the front frame. To reliably achieve engine cooling, the radiator is disposed forward of the front frame while disposed rearward of a vehicle body cover.

Requests have been made for compactly forming the entire vehicle of this type. As described above, however, the radiator is disposed forward of the front frame. The vehicle is accordingly required to have components for attaching the radiator to the vehicle and a space for blocking contact with and attachment of soil and water (e.g., mud) to the radiator. Finally, the entire vehicle size inevitably becomes large even if the front frame of a minimum required size is planned.

Moreover, according to the vehicle disclosed in the aforementioned patent publication, a driver operates a steering mechanism while seated. To achieve better operability and riding comfort for the driver, a considerable space is necessary between a seat and a front panel provided with the steering mechanism.

According to the conventional vehicle, the front section of the vehicle is particularly formed to have a large size. To compactly form the vehicle, the structure of the front section disposed forward of the cabin in particular should be carefully devised. Specifically, structures and arrangements of the front frame and a variety of components supported thereby (e.g., the front suspensions, the front gear case and the radiator) should be appropriately designed.

SUMMARY OF THE INVENTION

In view of the above, preferred embodiments of the present invention provide a vehicle having a compact front section even though a variety of components are functionally disposed in the front section.

An all terrain vehicle according to a preferred embodiment of the present invention includes a pair of right and left front wheels, at least a pair of right and left rear wheels, a vehicle body frame, a pair of right and left first roof supports, a pair of right and left second roof supports, a pair of right and left roof members, a seat, a front panel, a front gear case, a pair of front suspensions, a vehicle body cover, a radiator and a pair of right and left headlight units. The vehicle body frame supports the front wheels and the rear wheels. The vehicle body frame includes a pair of right and left upper frames, a pair of right and left lower frames, and a pair of right and left front frames. The upper frames extend in a longitudinal direction of the vehicle. The upper frames are disposed above the front wheels in a substantially vertical direction of the vehicle. The lower frames extend in the longitudinal direction of the vehicle. The lower frames are disposed below and opposed to the right and left upper frames in the substantially vertical direction of the vehicle, respectively. The front frames extend in the substantially vertical direction of the vehicle. The right front frame connects a front portion of the right upper frame and a front portion of the right lower frame, whereas the left front frame connects a front portion of the left upper frame and a front portion of the left lower frame. The first roof supports are provided at lateral sides of the vehicle body frame in a transverse direction of the vehicle, respectively. Each of the first roof supports includes a pipe member extending in the substantially vertical direction of the vehicle. The second roof supports are provided at lateral sides of the vehicle body frame in the transverse direction of the vehicle, respectively. The second roof supports are disposed rearward of the first roof supports in the longitudinal direction of the vehicle. Each of the second roof supports includes a pipe member extending in the substantially vertical direction of the vehicle. The right roof member connects an upper portion of the right first roof support and an upper portion of the right second roof support, whereas the left roof member connects an upper portion of the left first roof support and an upper portion of the left second roof support. The seat includes a seating surface disposed forward of the rear end of the second roof support in a transverse side view of the vehicle. The front panel sections a cabin and a front space of a front section of the vehicle. The cabin includes the seat therein. The front space is positioned longitudinally forward of the cabin. The front gear case is supported by the right and left lower frames. The right and left front suspensions include a pair of right and left shock absorbers, respectively. Upper ends of the shock absorbers are coupled to the pair of right and left upper frames, respectively, whereas lower ends of the shock absorbers are coupled to the pair of right and left front wheels. The vehicle body cover covers front of the front frames in the longitudinal direction of the vehicle. The radiator is disposed longitudinally rearward of the front frames in the transverse side view of the vehicle while disposed longitudinally forward of the shock absorbers in the transverse side view of the vehicle. The radiator is disposed in a position including a transverse center of the vehicle. The head light units are positioned above the radiator in the transverse side view of the vehicle. The head light units longitudinally overlap with the radiator.

According to a preferred embodiment of the present invention, the radiator is disposed in a space provided between the front end of the vehicle body frame and the shock absorbers. Additionally, the radiator and the head light units overlap in the substantially vertical direction. With the structure, the entire vehicle has a very compact configuration.

Additionally, the vehicle body cover is attached to the front end of the vehicle body frame. In other words, the frame exists between the vehicle body cover and the radiator. The radiator is thus disposed away from the vehicle body cover. With this unique structure, it is possible to inhibit contact with and attachment of soil and water (e.g., mud) to the radiator. Moreover, the radiator does not overlap with the suspensions. With the structure, the radiator is allowed to be enlarged in the transverse direction of the vehicle. This achieves enhancement of cooling performance of the radiator.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1A:
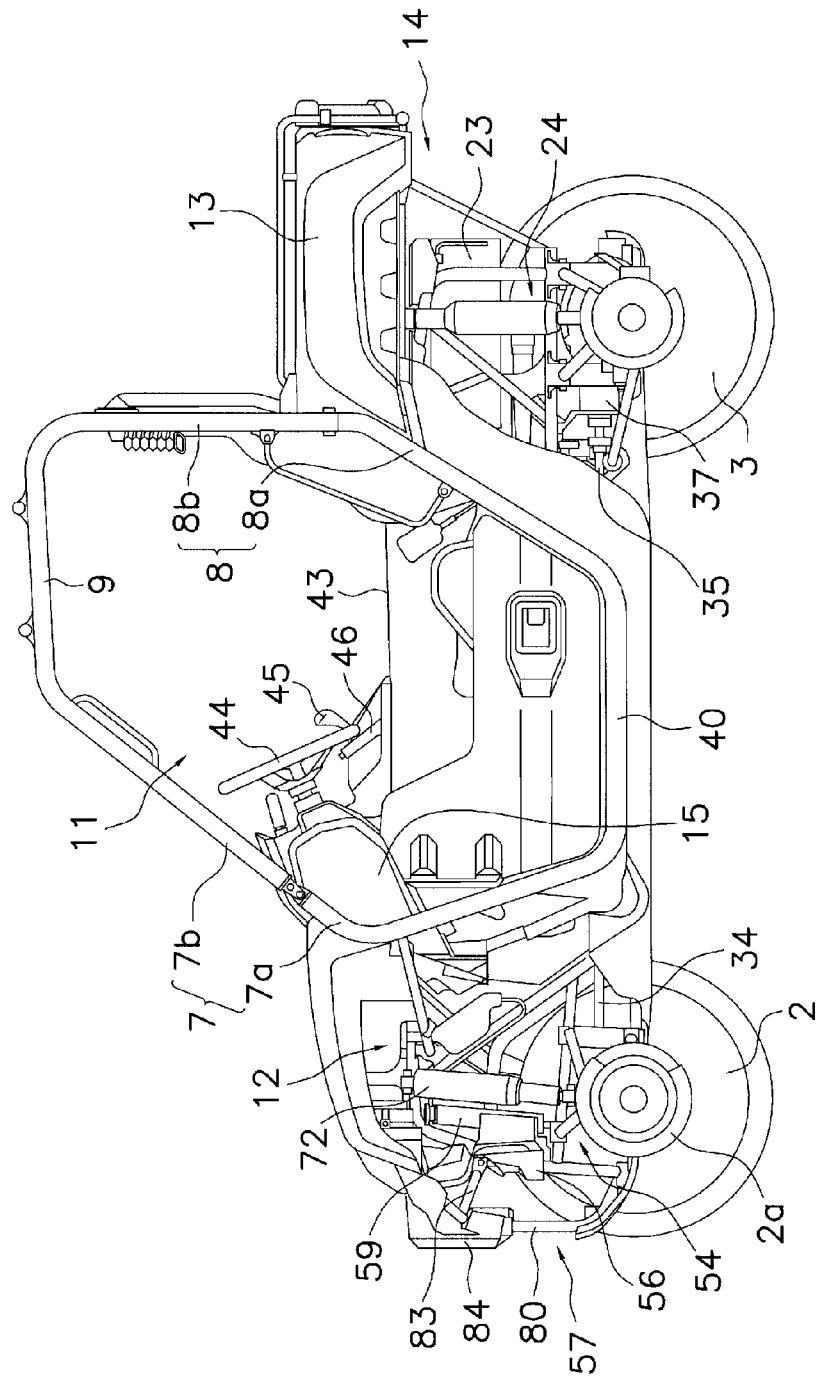
FIG. 1A is a side view of an all terrain vehicle according to a preferred embodiment of the present invention.
Figure 1B:
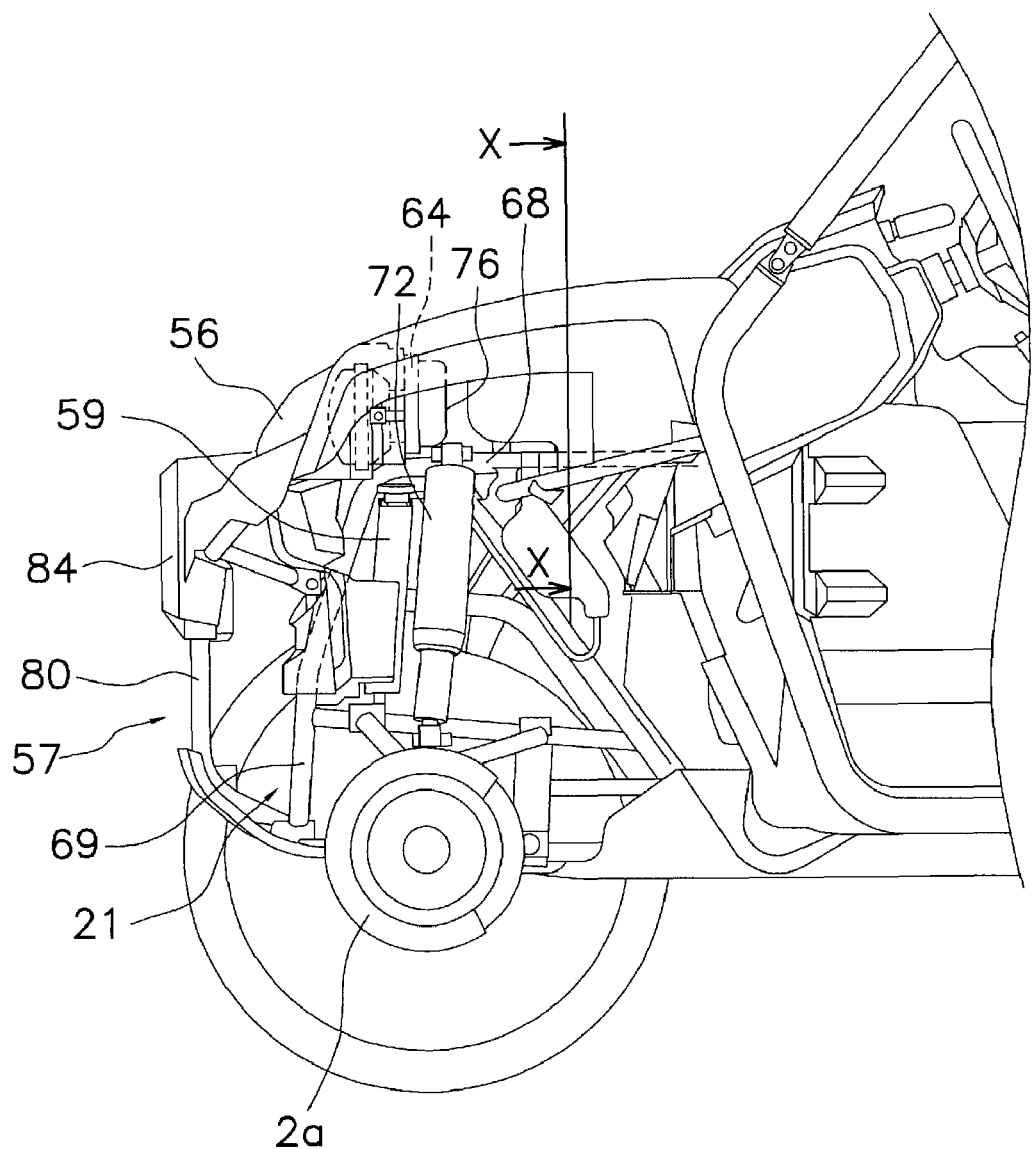
FIG. 1B is an enlarged view of a portion of the all terrain vehicle illustrated in FIG. 1A.
Figure 2:
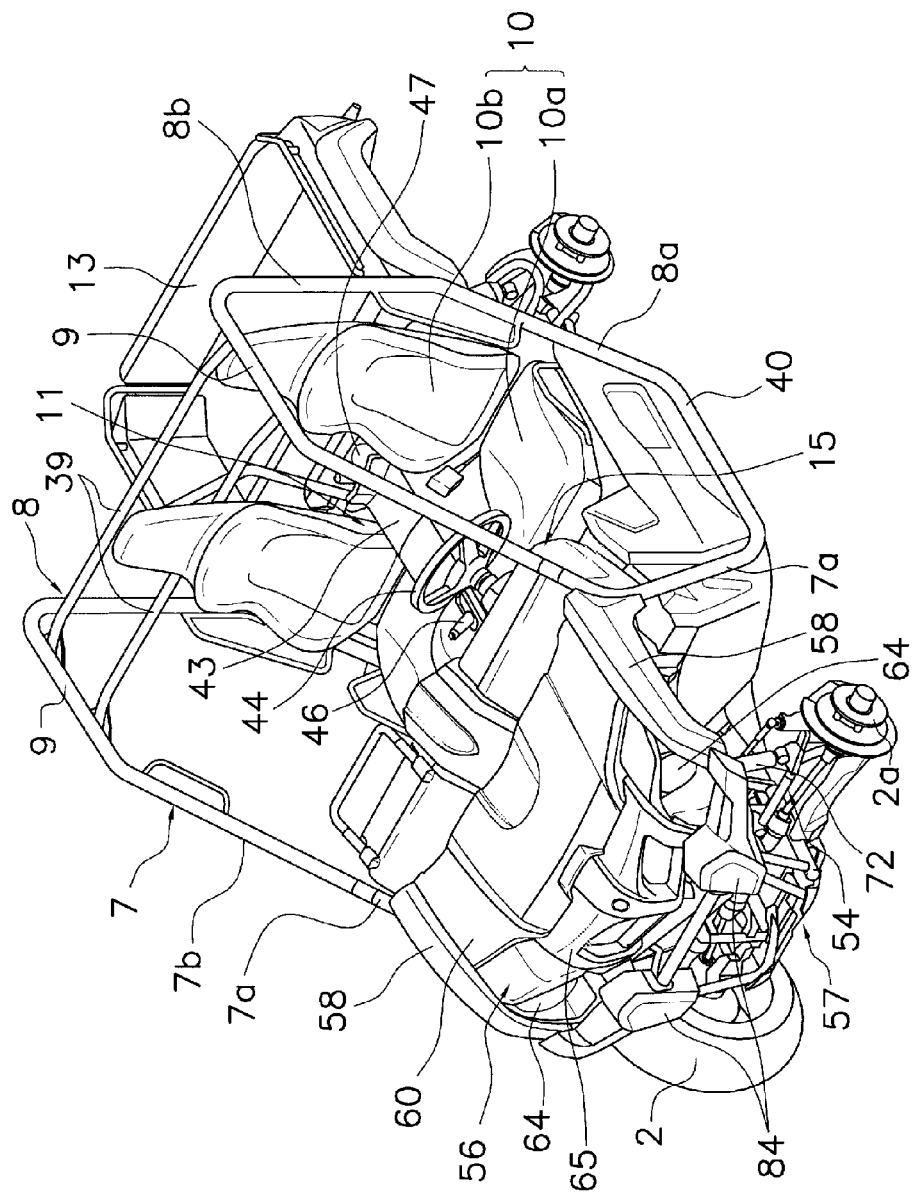
FIG. 2 is a perspective view of the entire all terrain vehicle.
Figure 3:
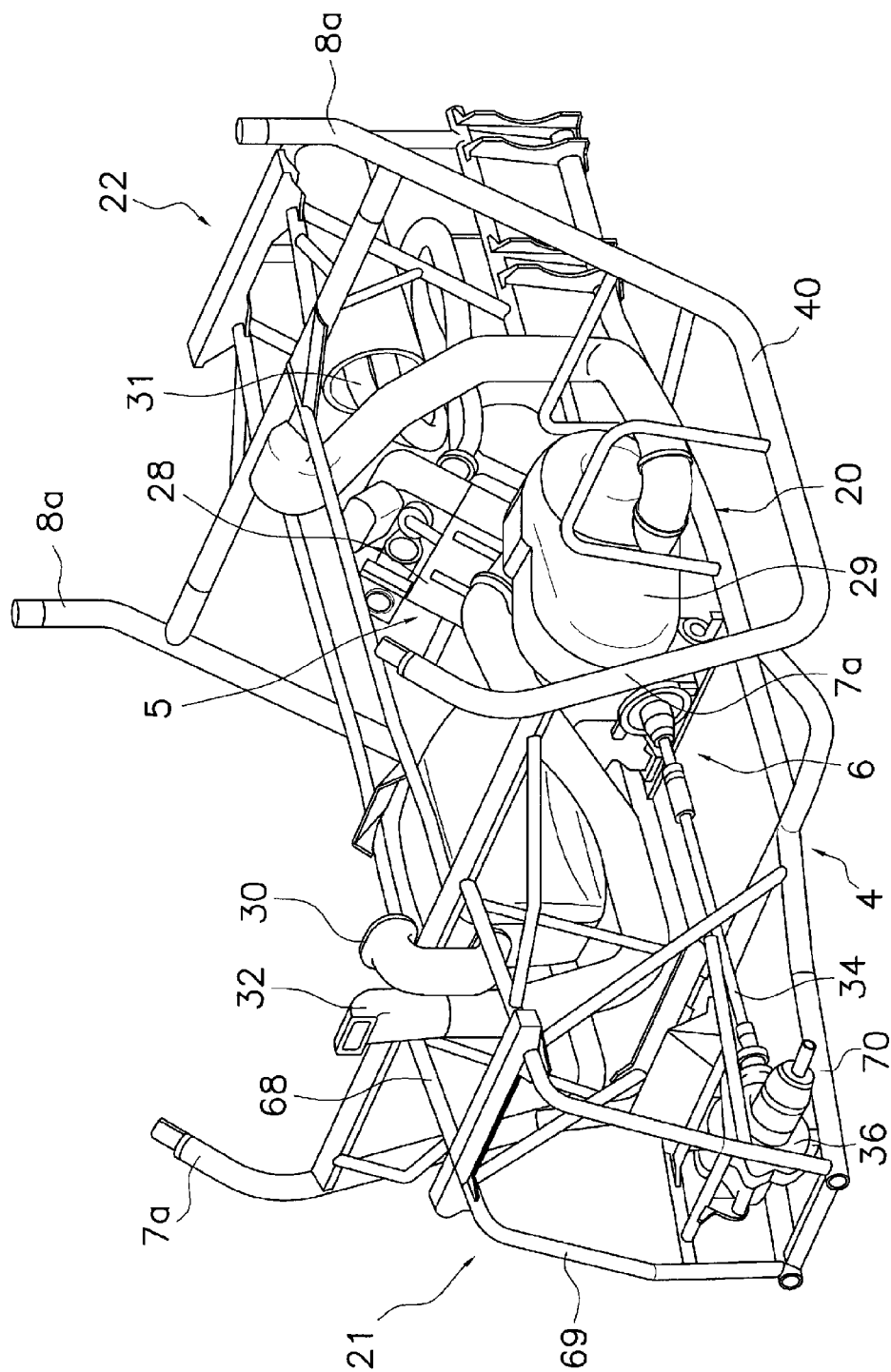
FIG. 3 is a perspective view of an entire vehicle body frame of the all terrain vehicle and a portion of mechanisms supported by the vehicle body frame.

FIG. 1A is a side view of an all terrain vehicle according to a preferred embodiment of the present invention. FIG. 1B is an enlarged view of a portion of the all terrain vehicle of FIG. 1A. FIG. 2 is a perspective view of the entire all terrain vehicle. FIG. 3 is a perspective view of a vehicle body frame and main members supported thereby, removed from the all terrain vehicle. Note that FIGS. 1A and 1B illustrate a condition of the all terrain vehicle in which left-front and left-rear wheels are removed. FIG. 2 also illustrates a condition of the all terrain vehicle in which the left-front and left-rear wheels are removed. FIG. 3 illustrates a condition of the vehicle body frame and main members supported thereby in which upper portions of roof supports are removed. Excluding special occasions, directional terms "front," "rear," "right" and "left" and their related directional terms, used in the present specification, indicate directions seen by a driver riding on the vehicle.

The all terrain vehicle, illustrated in FIGS. 1A to 3, includes a pair of right and left front wheels 2, a pair of right and left rear wheels 3, a vehicle body frame 4, an engine unit 5, a power transmission mechanism 6, a pair of first roof supports 7, a pair of second roof supports 8, and a pair of roof members 9. The vehicle body frame 4 supports the front wheels 2 and the rear wheels 3. The power transmission mechanism 6 is configured to transmit power of the engine unit 5 to the front wheels 2 and the rear wheels 3. The first roof supports 7 and the second roof supports 8 are provided at transversely lateral sides of a longitudinally center portion of the vehicle body frame 4, respectively. Furthermore, the all terrain vehicle includes a cabin 11, a front space 12 and a rear space 14. The cabin 11 accommodates the seats 10. The cabin 11 thus functions as a space for carrying a driver and/or a passenger. The front space 12 is a front section of the vehicle disposed forward of the cabin 11. The rear space 14 is a rear section of the vehicle that a cargo 13 is disposed thereon. Additionally, a front panel 15 is provided between the cabin 11 and the front space 12. The cabin 11 and the front space 12 are thus sectioned by the front panel 15.

The vehicle body frame 4 mainly includes a center frame unit 20, a front frame unit 21 and a rear frame unit 22. The center frame unit 20 defines a bottom portion of the cabin 11. The front frame unit 21 is disposed in the front space 12 positioned forward of the center frame unit 20. The front frame unit 21 thus defines a front section of the vehicle. Additionally, the rear frame unit 22 is disposed in a rear space 14 positioned rearward of the center frame unit 20. The rear frame unit 22 thus defines a rear section of the vehicle.

The center frame unit 20 includes a plurality of pipe members. The center frame unit 20 supports the engine unit 5 through engine brackets (not illustrated in the figure).

Similarly to the center frame unit 20, each of the front frame unit 21 and the rear frame unit 22 includes a plurality of pipe members. The rear frame unit 22 supports a variety of components, including e.g., an exhaust duct 23 and a pair of right and left rear suspensions 24. The front frame unit 21 and its related components will be hereinafter explained in detail.

The engine unit 5 occupies an area extending from transversely below the seats 10 to rearward of the seat units 10. As described above, the engine unit 5 is supported by the center frame unit 20 through the engine brackets. The engine unit 5 includes an engine body 28 and a V-belt type continuously variable transmission (CVT) 29. The CVT 29 is disposed leftward of the engine body 28. Note that an intake-related mechanism 30 and an exhaust-related mechanism 31 are connected to the engine body 28. The intake-related mechanism 30 (e.g., an air cleaner) is disposed in the front section of the vehicle whereas the exhaust-related mechanism 31 is disposed in the rear section of the vehicle. A cooling duct 32 is connected to the CVT 29 for mainly cooling a belt. The cooling duct 32 is disposed rearward of the front space 12. In other words, the cooling duct 32 is disposed in the portion positioned forward of the cabin 11.

The power transmission mechanism 6 includes a front drive shaft 34, a rear drive shaft 35, a front gear case 36 and a rear gear case 37. The front drive shaft 34 and the rear drive shaft 35 are connected to the output side of the CVT 29. The front gear case 36 is disposed among the tip of the front drive shaft 34 and the front wheels 2 whereas the rear gear case 37 is disposed among the tip of the rear drive shaft 35 and the rear wheels 3.

The pair of right and left first roof supports 7, the pair of right and left second roof supports 8 and the pair of right and left roof members 9 define a pair of right and left lateral frames of the cabin 11.

The first roof supports 7 define the front ends of the pair of right and left lateral sides of the cabin 11. Each of the first roof supports 7 includes a pipe member extending in the substantially vertical direction. Each of the first roof supports 7 is divided into a lower support 7a and an upper support 7b. The lower support 7a and the upper support 7b are coupled preferably by a single or plurality of bolts, for example. The lower support 7a slants forward from its lower end to its upper end (i.e., a coupling portion with the upper support 7b). On the other hand, the upper support 7b slants rearward from its lower end (i.e., a coupling portion with the lower support 7a) to its upper end.

The second roof supports 8 define the rear ends of the pair of right and left lateral sides of the cabin 11. Each of the second roof supports 8 includes a pipe member extending in the substantially vertical direction. Similarly to the first roof supports 7, each of the second roof supports 8 is divided into a lower support 8a and an upper support 8b. The lower support 8a and the upper support 8b are coupled preferably by a single or plurality of bolts, for example. The lower support 8a slants rearward from its lower end to its upper end (i.e., a coupling portion with the upper support 8b). On the other hand, the upper support 8b is disposed approximately-upright.

Note each of the first and second roof supports 7 and 8 is divided into lower and upper supports at its approximately vertical center portion. The coupling portions between the lower and upper supports are positioned at approximately the same height as the upper end of the front panel 15.

Each of the roof members 9 includes a pipe member extending in the longitudinal direction. The right/left roof member 9 is provided between the upper end of the right/left first roof support 7 and the upper end of the right/left second roof support 8. The roof members 9 are approximately horizontally disposed. Furthermore, two coupling members 39 are disposed between the pair of right and left roof members 9. The roof members 9 are coupled by the coupling members 39.

The right and left lateral frames of the cabin 11 further include a pair of right and left lower members 40 in addition to the first roof supports 7, the second roof supports 8 and the roof members 9. Each of the lower members 40 includes a pipe member. The right/left lower member 40 is disposed between the lower end of the right/left first roof support 7 and the lower end of the right/left second roof support 8. The lower members 40 are approximately horizontally disposed. The lower members 40 are thus opposed to the roof members 9 in the substantially vertical direction.

In the present preferred embodiment, the right/left upper support 7b of the right/left first roof support 7, the right/left upper support 8b of the right/left second roof support 8 and the right/left roof member 9 are preferably formed by bending a piece of pipe member, for example. Similarly, the right/left lower support 7a of the right/left first roof support 7, the right/left lower support 8a of the right/left second roof support 8 and the right/left lower member 40 are preferably formed by bending a piece of member, for example.

Figure 4:
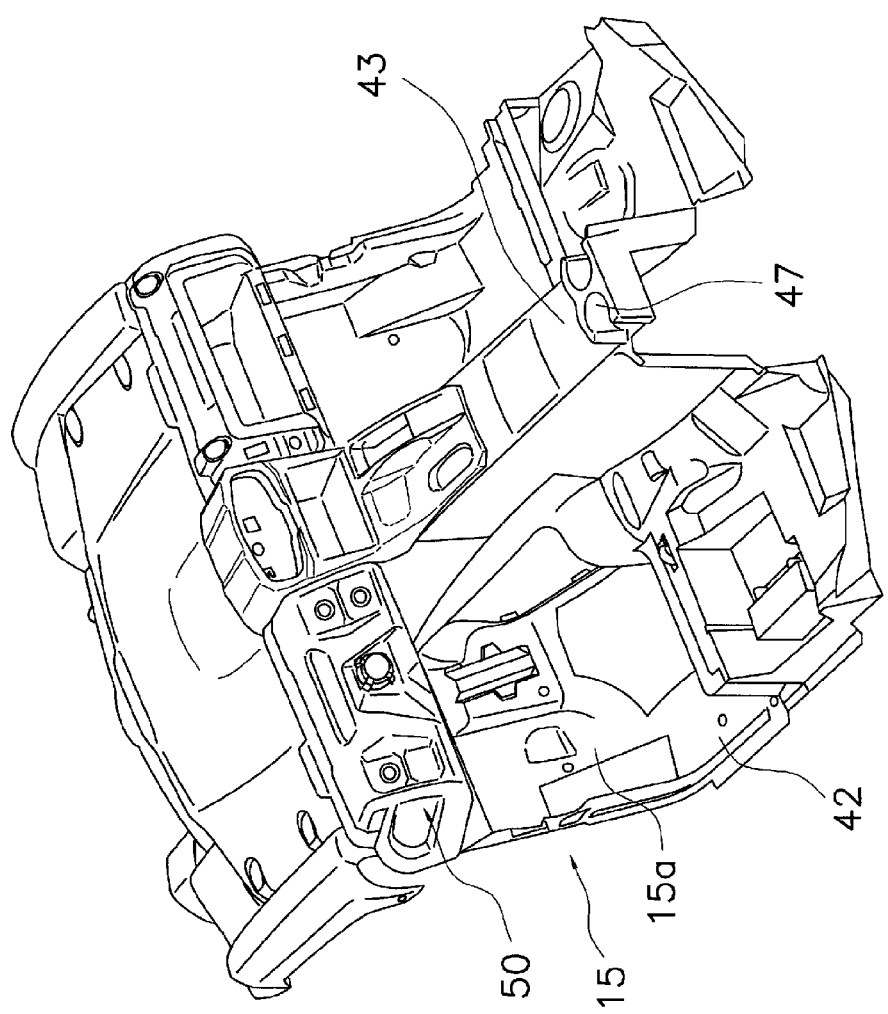
FIG. 4 is a perspective view of an entire front panel and its periphery.

As seen in FIGS. 1A, 2 and 4, the cabin 11 is provided with the front panel 15, a bottom floor panel 42 and a center console 43. The center console 43 is disposed between the right and left seats 10. The cabin 11 is defined as a space enclosed by the floor panel 42, the front panel 15, and a portion of the pair of right and left lateral frames (including the first and second roof supports 7 and 8 and the roof members 9) disposed above the front panel 15.

A steering mechanism 44 is disposed in front of the left seat 10 within the cabin 11. The seats 10 are disposed forward of the rear ends of the second roof supports 8 within the cabin 11. More specifically, each of the right and left seats 10 includes a seating surface 10a and a back support 10b. The back support 10b supports the back of a driver/passenger. The back supports 10b of the seats 10 may overlap with the second roof supports 8 in the longitudinal direction. Alternatively, the back supports 10b may be partially positioned rearward of the second roof supports 8. However, the seating surfaces 10a of the seats 10 are always positioned forward of the rear ends of the second roof supports 8.

Furthermore, the center console 43 is disposed rearward of the front panel 15 while disposed in approximately the center portion of the vehicle in the transverse direction. The center console 43 extends rearward of the seats 10. The center console 43 includes left, right and upper walls. The center console 43 is formed in an inverse U-shape, and thereby includes an inner space. As illustrated in FIG. 1A, a speed change control lever 45 and a side brake control lever 46 are disposed in the front portion of the center console 43 whereas a bottle receiver 47 (see FIGS. 2 and 4) is disposed on the rear portion of the center console 43 for receiving a single or plurality of beverage bottles.

As described above, the front panel 15 is a member for sectioning the cabin 11 and the front space 12 positioned forward of the cabin 11. As illustrated in FIG. 4, the front panel 15 includes a vertical panel 15a and a dashboard 50.

Figure 5:
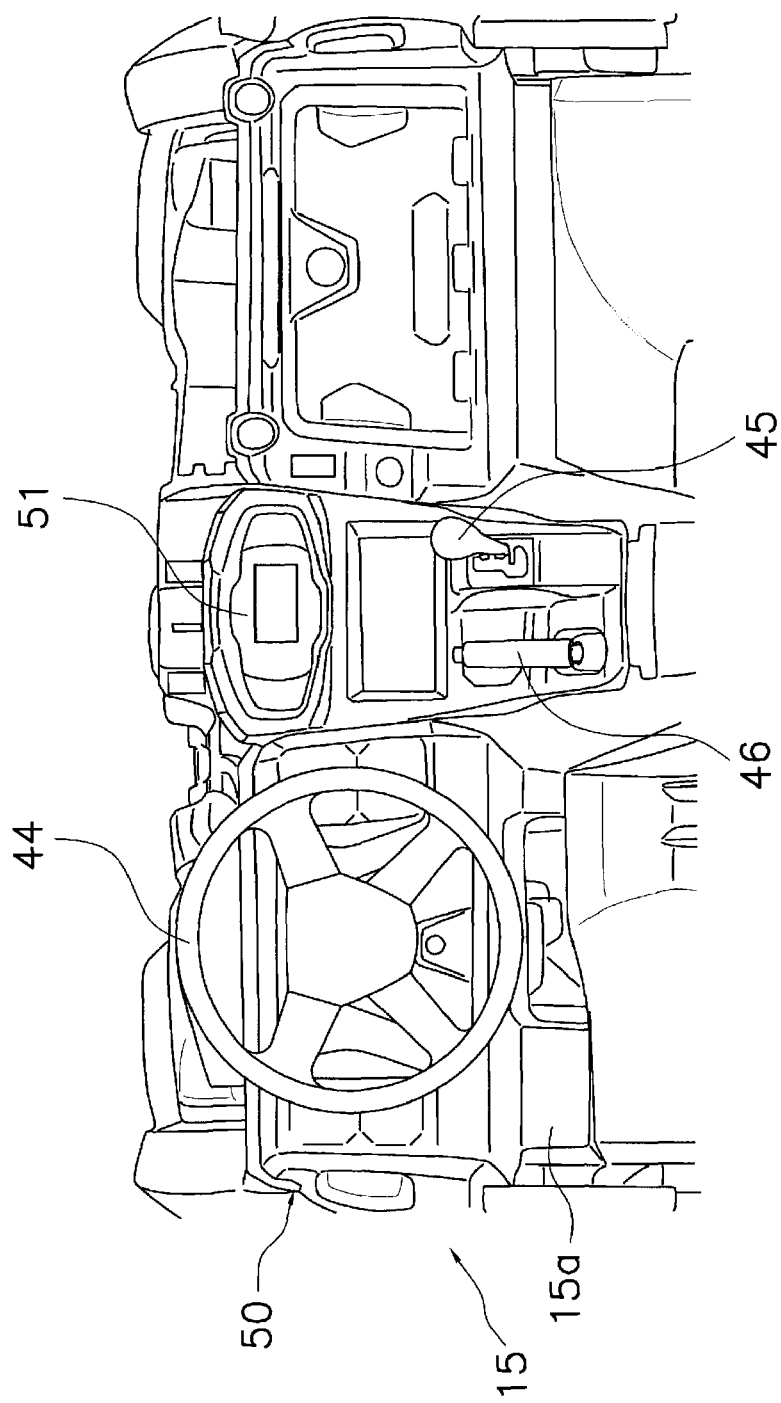
FIG. 5 is a diagram of the front panel seen from within the cabin.

The vertical panel 15a extends continuously upward from the floor panel 42 of the cabin 11. The dashboard 50 is disposed on the upper end of the vertical panel 15a. As illustrated in FIG. 5, the steering mechanism 44 is attached to the left portion of the dashboard 50 whereas a meter unit 51, including a display (e.g., a speedometer), is disposed in the transversely center portion of the dashboard 50. Electric components are installed in the interior of the meter unit 51.

Next, structure of the front section of the vehicle, that is, structure of the front space 12 positioned forward of the front panel 15, will be hereinafter explained in detail.

As described above, the front frame unit 21 is disposed in the front space 12. As illustrated in FIGS. 1A to 3 and 6, the front frame unit 21 supports the front gear case 36, a pair of right and left front suspensions 54, a front box 55, a front cover 56, a front carry bar 57, a pair of right and left front fenders 58 and a radiator 59. Additionally, a hood 60 is disposed between the front fenders 58. Moreover, right and left head light units 64 and a front grill 65 are attached to the front cover 56.

As illustrated in FIG. 3, the front frame unit 21 is transversely symmetrically formed. The right-half/left-half portion of the front frame unit 21 includes a right/left upper frame 68, a right/left vertical frame 69 and a right/left lower frame 70. The right and left upper frames 68 are coupled to the upper front end of the center frame unit 20, and extend forward therefrom. The right/left vertical frame 69 is formed in a bent shape, and extends downward from the front end of the right/left upper frame 68. The right and left lower frames 70 are coupled to the lower front end of the center frame unit 20, and extend forward therefrom. The front end of the right/left lower frame 70 is connected to the lower end of the right/left vertical frame 69. Note the frame elements 68, 69 and 70 are coupled by separate coupling members in the substantially vertical, longitudinal and transverse directions. The structure enhances stiffness of the entire front frame unit 21.

The front gear case 36 is supported by the right and left lower frames 70. Additionally, the front gear case 36 is coupled to a pair of right and left hubs 2a of the right and left front wheels 2 by a pair of right and left shafts (see FIGS. 1A, 1B and 2).

Each of the right and left front suspensions 54 includes a shock absorber 72 and an arm member. The right and left shock absorbers 72 are arranged in an inverse V-shape in a front view of the vehicle. The lower end of the right/left shock absorber 72 is coupled to the right/left hub 2a of the right/left front wheel 2 through e.g., a knuckle arm whereas the upper end of the right/left shock absorber 72 is supported by the front portion of the right/left upper frame 68.

Figure 6:
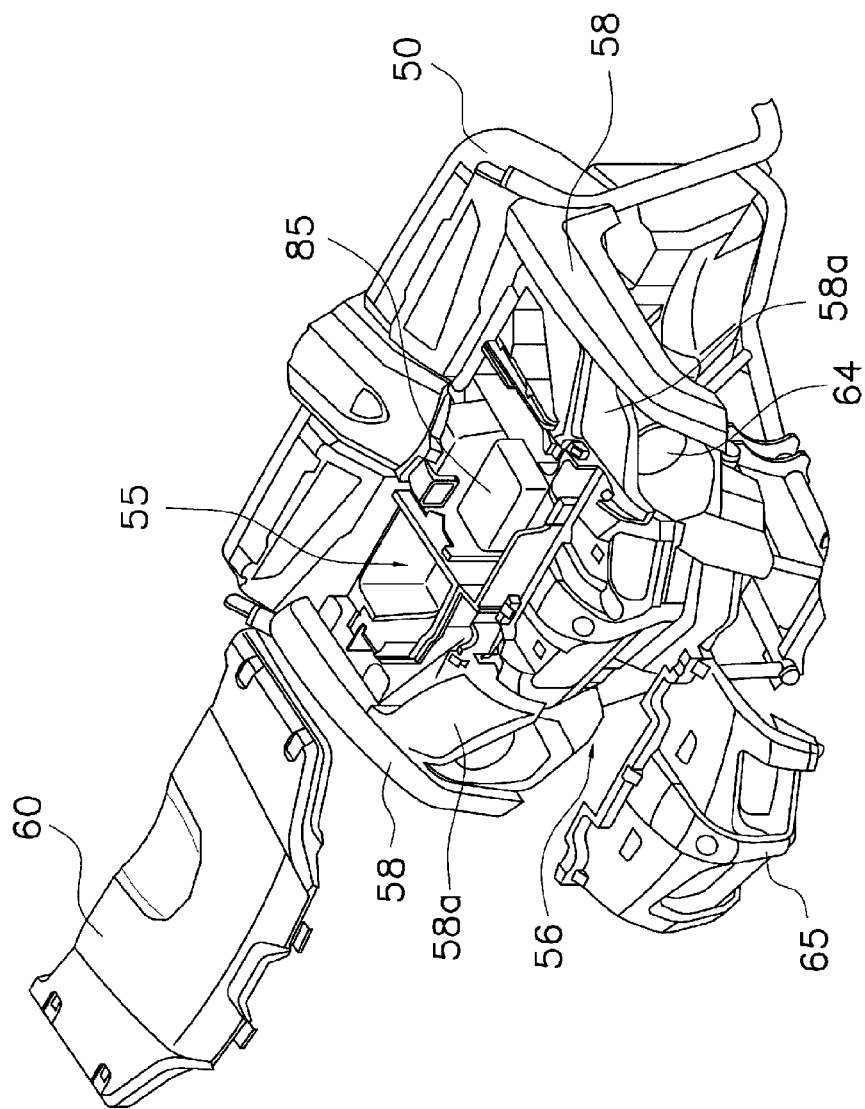
FIG. 6 is an exploded view of a front section of the all terrain vehicle while a cover is removed from the front section.
Figure 7:
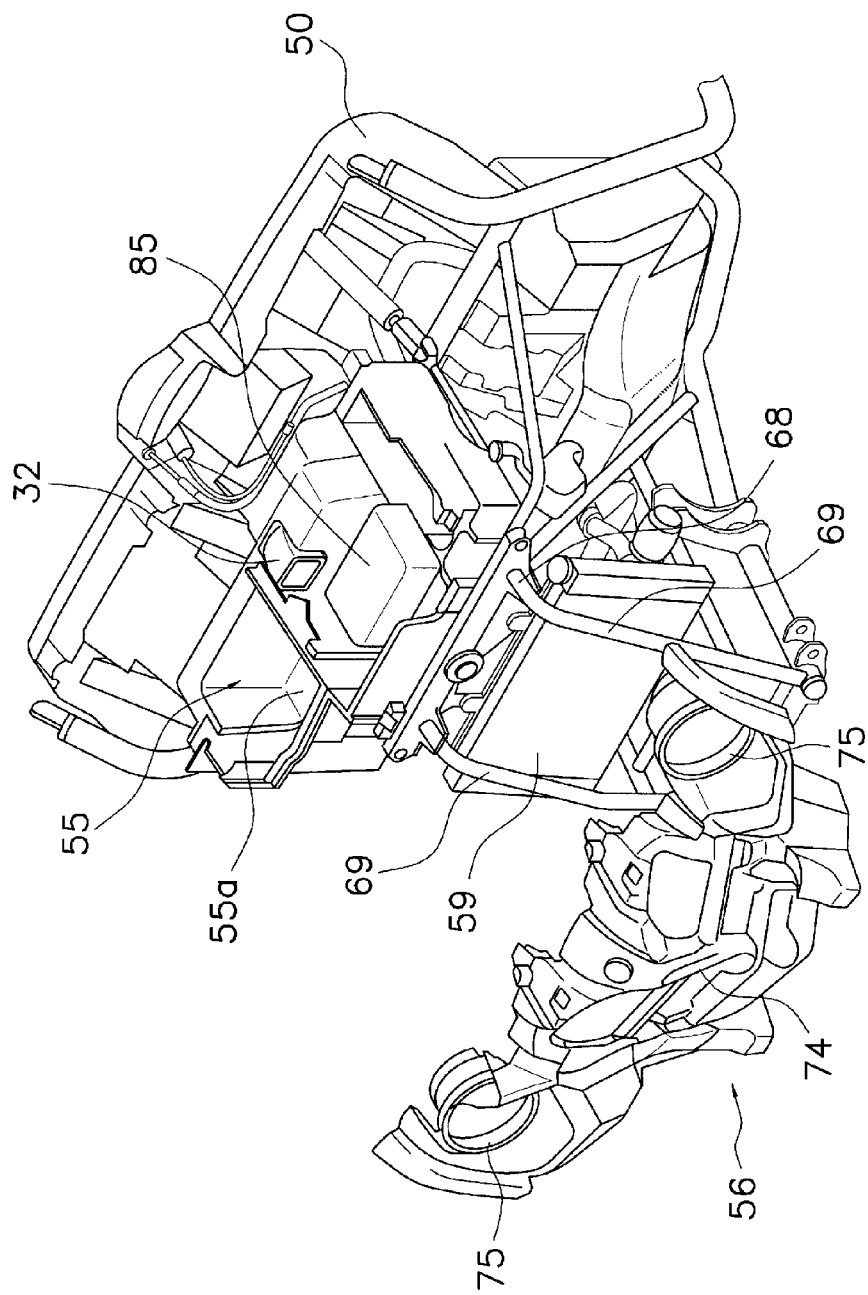
FIG. 7 is a detailed view of the front cover.

As illustrated in detail in FIGS. 6 and 7, the front cover 56 includes a center portion 74 and a pair of right and left head light covers 75. The center portion 74 is provided in approximately the center of the front cover 56 in the transverse direction, and includes an opening. The center portion 74 and the head light covers 75 preferably are integrally formed. The center portion 74 is disposed forward of the radiator 59 for covering it. The lower end of the center portion 74 extends further downward than the lower end of the radiator 59.

The front grill 65 covers the front of the center portion 74 of the front cover 56.

Figure 9:
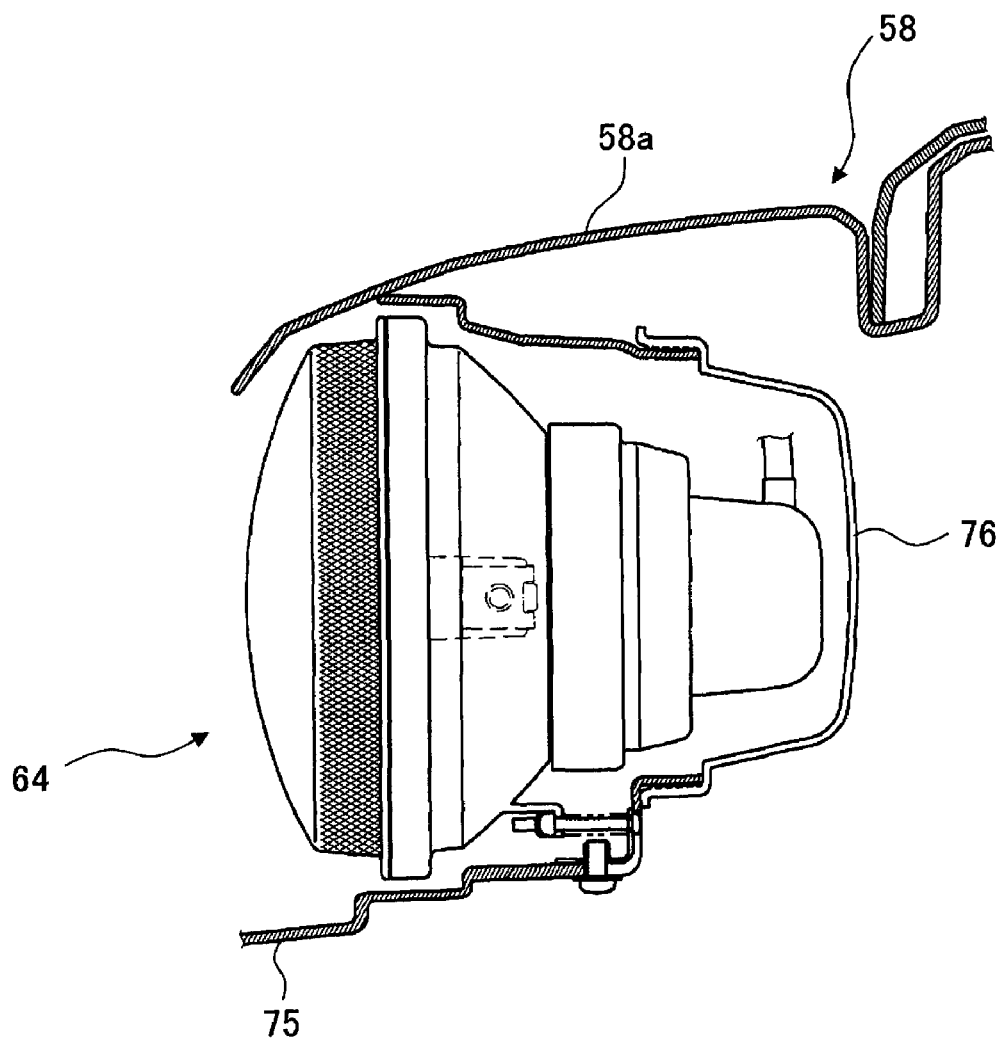
FIG. 9 is a detailed view of an attachment condition of a head light unit.

As illustrated in FIG. 9, each of the right and left head light units 64 includes a variety of components (e.g., a bulb, a reflection mirror and a lens) in its interior. The right/left head light cover 75 of the front cover 56 covers the surrounding of the right/left head light unit 64. Furthermore, a pair of right and left caps 76 are provided rearward of the head light units 64. The right/left cap 76 covers the back of the right/left head light cover 75.

The right/left head light unit 64 is attached to the right/left head light cover 75 preferably by a plurality of screws (not illustrated in the figure), for example. A positional relationship between the right/left head light unit 64 and the right/left head light cover 75 will be hereinafter explained.

As illustrated in detail in FIGS. 1A, 1B and 2, the front carry bar 57 includes a plurality of members (e.g., pipe members 80 and 83). The front carry bar 57 is fixed to the front end of the front frame unit 21. Additionally, the front carry bar 57 is disposed further forward than the front cover 56 and the front grill 65. Right and left resin covers 84 are attached to the transversely lateral ends of the front carry bar 57, respectively.

L-shaped members 80 extend in the substantially vertical direction. The upper coupling member 81 couples upper portions of the right and left L-shaped members 80 whereas the lower coupling member 82 couples lower portions of the right and left L-shaped members 80. The lower end of the right/left L-shaped member 80 is coupled to the right/left lower frame 70 of the front frame unit 21. Furthermore, the right/left lateral coupling member 83 couples the upper portion of the right/left L-shaped member 80 and the right/left vertical frame 69 of the front frame unit 21. Note each of the members of the frame preferably is a pipe member.

Figure 8:
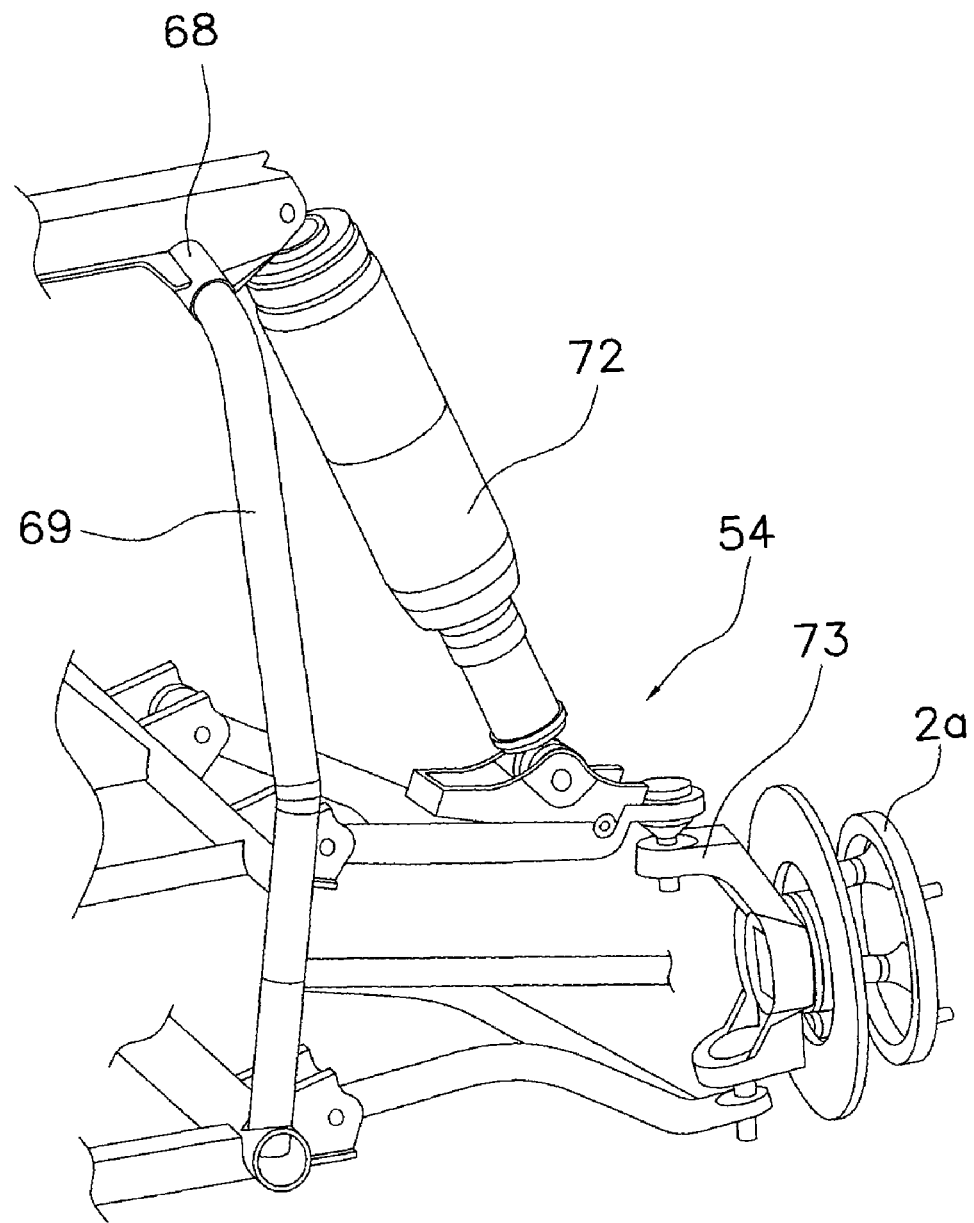
FIG. 8 is a perspective view of an entire front suspension.

The right and left front fender 58 cover above the right and left front wheels 2, respectively. As illustrated in FIG. 6, an extension 58a is formed in the front portion of each front fender 58. The extensions 58a extend toward the transverse center of the vehicle. As illustrated in FIG. 8, the right/left extension 58a covers above the right/left head light cover 75. The front end of the right/left extension 58a extends forward of the front end of the upper portion of the right/left head light cover 75. The front end of the right/left extension 58a reaches approximately the same position as the front end of the lower portion of the right/left head light cover 75.

Figure 10:
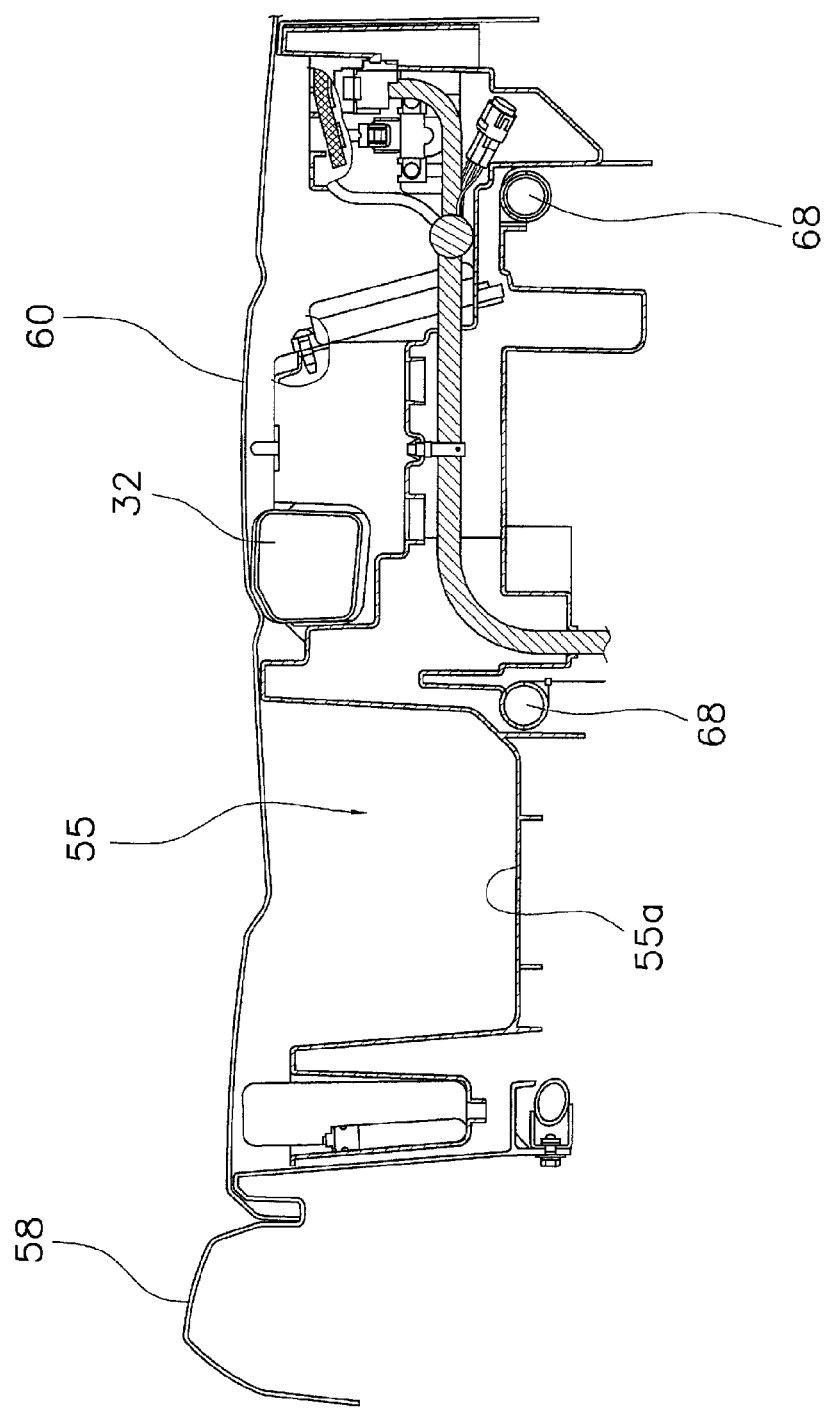
FIG. 10 is a partial cross-sectional side view of a front section of the vehicle.

As illustrated in FIGS. 1A, 1B and 7, the radiator 59 is disposed rearward of the vertical frames 69 of the front frame unit 21 while being disposed forward of the shock absorbers 72 of the front suspensions 54. Additionally, an opening of the cooling duct 32, the front box 55 and electric components (e.g., the battery 85) are disposed between the radiator 59 and the dashboard 50 of the front panel 15. Moreover, the radiator 59 is disposed in a transverse center of the vehicle. In other words, the radiator 59 is disposed rearward of the center portion 74 of the front cover 56 as described above. The radiator 59 overlaps with the vertical frames 69 in a front view of the vehicle. The transverse lateral ends of the radiator 59 extends further transversely outward than the frames 68, 69, 70. As is seen in FIGS. 7 and 10 (i.e., a perspective view of the front section of the vehicle, sectioned along Line X-X of FIG. 1B), the radiator 59 is disposed below the upper frames 68 and the upper frames 68 are positioned at approximately the same height as a bottom surface 55a of the front box 55. In other words, the radiator 59 is disposed below the front box 55. As is seen in FIG. 1B, the radiator 59 and the head light units 64 substantially vertically overlap with each other in a side view of the vehicle.

Figure 11:
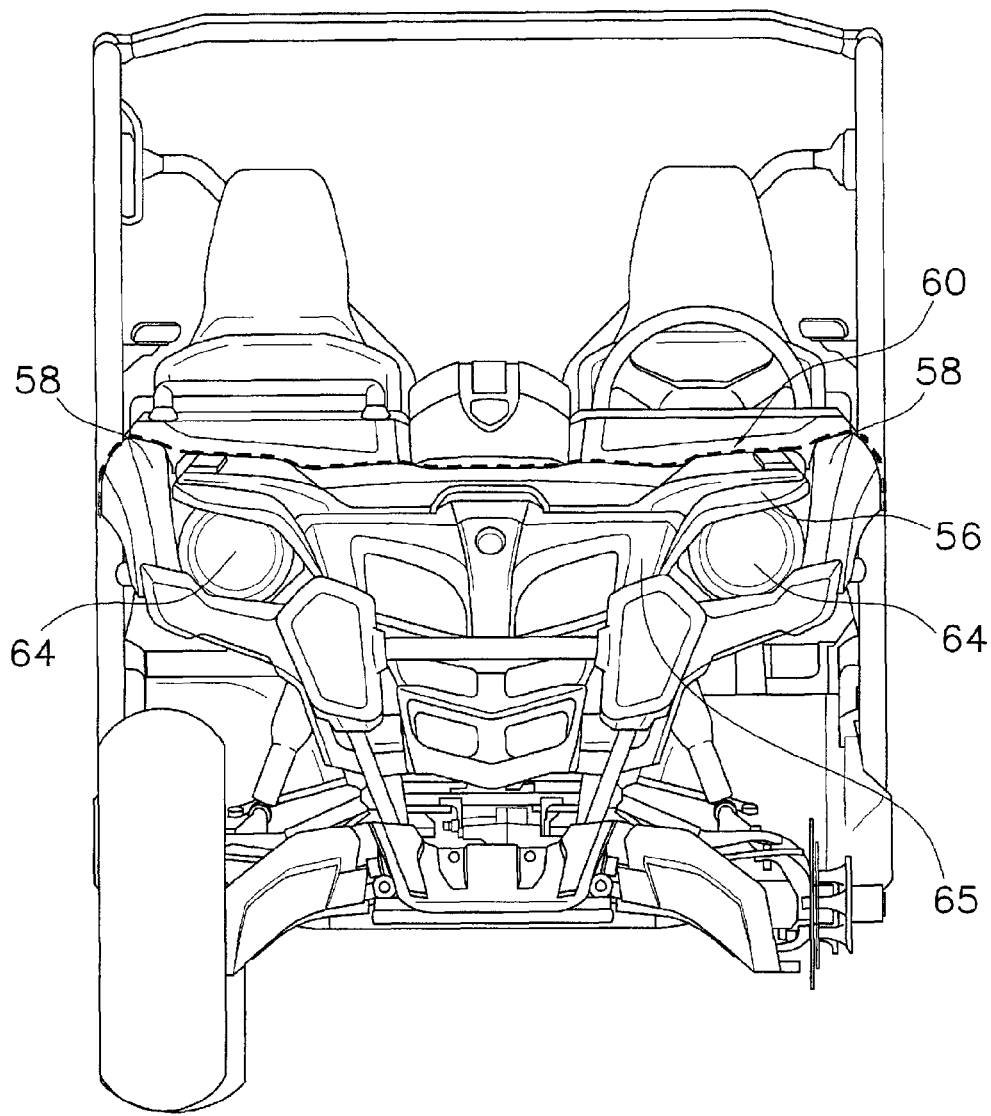
FIG. 11 is a front view of the vehicle.

The hood 60 is disposed between the front fenders 58 for covering an area above the front box 55. The hood 60 is fixed to the front fenders 58. As is seen in a front view of the vehicle illustrated in FIG. 11, a thick dashed line indicates that the upper surface of the hood 60 is positioned lower than the front surfaces of the right and left front fenders 58. In other words, the upper surfaces of the right and left front fenders 58 (i.e., right and left lateral sides of the vehicle) are positioned higher than the upper surface of the hood 60 interposed therebetween. More specifically, transversely lateral portions of the hood 60 are positioned higher than a transversely center portion thereof. Additionally, the right and left front fenders 58 continue to the transversely right and left ends of the hood 60. A transversely outer portion of the right/left front fender 58 is basically positioned higher than a transversely inner portion thereof. Once reaching the highest position, however, the right/left front fender 58 slants downward at an acute angle in the front view of the vehicle.

Thus, the transversely center portion of the vehicle is positioned lower than the transversely lateral portions of the vehicle. With this unique structure, it is possible to further prevent soil and water (e.g., mud) from flying toward a driver and/or a passenger from the transverse directions while wide forward visibility is achieved for a driver and/or a passenger.

The front grill 65 is a member extending in the substantially vertical direction. The front grill 65 is attached to the front surface of the center portion 74 of the front cover 56. In other words, the front grill 65 is disposed rearward of the front carry bar 57. The front grill 65 and the center portion 74 of the front cover 56 block intrusion of soil and water (e.g., mud) into the interior of the vehicle from the front direction of the vehicle.

Regarding the aforementioned structure, positional relationships among members of the front section of the vehicle will be hereinafter collectively described.

The radiator 59 is preferably disposed in the space between the vertical frames 69 of the front frame unit 21 and the shock absorbers 72 of the front suspensions 54. The space, which is provided in the front section of the vehicle, is thus efficiently used for disposing the radiator 59. With the structure, it is possible to compactly form the front section of the vehicle.

Additionally, the radiator 59 is preferably disposed forward of the shock absorbers 72. It is thereby possible to reliably keep a space positioned rearward of the radiator 59 and forward of the dashboard 50. The space is usable for accommodating the front box 55, the opening of the cooling duct 32, electric components (e.g., the battery 85).

In a side view of the vehicle, the radiator 59 and the head light units 64 substantially vertically overlap in the front section of the vehicle. With the structure, it is possible to further compactly form the front section of the vehicle.

The front cover 56 is attached to the front end of the front frame unit 21. The vertical frames 69 of the front frame unit 21 are disposed between the front cover 56 and the radiator 59. In other words, the radiator 59 is disposed rearwardly away from the front cover 56. With the structure, soil and water (e.g., mud) do not easily contact with or attach to the radiator 59 even if entering behind the front cover 56.

The radiator 59 is preferably disposed forward of the shock absorbers 72 of the front suspensions 54. In other words, the radiator 59 does not overlap with the front suspensions 54 in the longitudinal direction. With this unique structure, the radiator 59 can be significantly enlarged in the transverse direction of the vehicle. Accordingly, the radiator 59 is capable of reliably providing a large cooling capacity.

The aforementioned preferred embodiment exemplifies that each roof support preferably includes separately divided upper and lower supports. However, it is possible to apply the present invention to a type of vehicle provided with roof supports composed of only the upper supports described in the aforementioned preferred embodiment.

Specific structures of the vehicle body frame and the vehicle body cover are not particularly limited to the aforementioned preferred embodiment. For example, the front cover may be composed of separately formed members, that is, the head light covers and the center portion.

Disposition of the radiator is not particularly limited to the aforementioned preferred embodiment. For example, the radiator may be arbitrarily disposed as long as it includes the transverse center of the vehicle. In this case, the radiator may not be transversely symmetrically disposed with respect to the transverse center of the vehicle.

In the aforementioned preferred embodiment, the present invention is preferably applied to a two-seat vehicle. However, it is similarly possible to apply the present invention to a type of vehicle provided with a rear seat(s) in addition to the front seats.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An all terrain vehicle comprising:
   a pair of right and left front wheels;
   at least a pair of right and left rear wheels;
   a vehicle body frame arranged to support the front wheels and the rear wheels, the vehicle body frame including:
      a pair of right and left upper frames extending in a longitudinal direction of the vehicle, the right and left upper frames being disposed above the front wheels in a substantially vertical direction of the vehicle;
      a pair of right and left lower frames extending in the longitudinal direction of the vehicle, the right and left lower frames being disposed below and opposed to the right and left upper frames in the substantially vertical direction of the vehicle, respectively; and
      a pair of right and left front frames extending in the substantially vertical direction of the vehicle, the right front frame connecting a front portion of the right upper frame and a front portion of the right lower frame, the left front frame connecting a front portion of the left upper frame and a front portion of the left lower frame;
   a pair of right and left first roof supports provided at lateral sides of the vehicle body frame in a transverse direction of the vehicle, respectively, each of the first roof supports includes a pipe member extending in the substantially vertical direction of the vehicle;
   a pair of right and left second roof supports provided at the lateral sides of the vehicle body frame in the transverse direction of the vehicle, respectively, the second roof supports disposed rearward of the first roof supports in the longitudinal direction of the vehicle, each of the second roof supports including a pipe member extending in the substantially vertical direction of the vehicle;
   a pair of right and left roof members, the right roof member connecting an upper portion of the right first roof support and an upper portion of the right second roof support, the left roof member connecting an upper portion of the left first roof support and an upper portion of the left second roof support;
   a seat including a seating surface disposed forward of a rear end of the second roof support in a transverse side view of the vehicle;
   a front panel arranged to separate a cabin and a front space of a front section of the vehicle, the cabin including the seat therein, the front space positioned longitudinally forward of the cabin;
   a front gear case supported by the right and left lower frames;
   a pair of right and left front suspensions including a pair of right and left shock absorbers, respectively, upper ends of the shock absorbers being coupled to the pair of right and left upper frames, respectively, lower ends of the shock absorbers coupled to the pair of right and left front wheels;
   a vehicle body cover arranged to cover a front of the front frames in the longitudinal direction of the vehicle;
   a radiator disposed rearward of the front frames in the transverse side view of the vehicle and disposed longitudinally forward of the shock absorbers in the transverse side view of the vehicle, the radiator disposed in a position including a transverse center of the vehicle; and
   a pair of right and left head light units positioned above the radiator in the transverse side view of the vehicle, the head light units longitudinally overlapping with the radiator.

2. The all terrain vehicle according to claim 1, wherein the radiator overlaps with the front frames in a front view of the vehicle.

3. The all terrain vehicle according to claim 1, wherein the radiator extends further transversely outward than the upper frames and the lower frames.

4. The all terrain vehicle according to claim 1, further comprising a battery disposed longitudinally rearward of the radiator.

5. The all terrain vehicle according to claim 1, wherein the vehicle body cover extends to at least a lower end of the radiator in the substantially vertical direction of the vehicle.

6. The all terrain vehicle according to claim 1, wherein the vehicle body cover includes head light covers and a center portion, the head light covers covering the head light units, respectively, the center portion positioned longitudinally forward of the radiator, the head light covers and the center portion being integral.

7. The all terrain vehicle according to claim 1, wherein the vehicle body cover includes:
   a hood positioned longitudinally forward of the front panel, the hood positioned above the vehicle body frame; and
   lateral portions positioned at least transversely lateral to the hood, the lateral portions including upper surfaces positioned higher than an upper surface of the hood.

* * * * *